(No Model.)
H. DE L. WEED & R. P. DEARDORFF.
CRANK FOR BICYCLES.
No. 594,109. Patented Nov. 23, 1897.
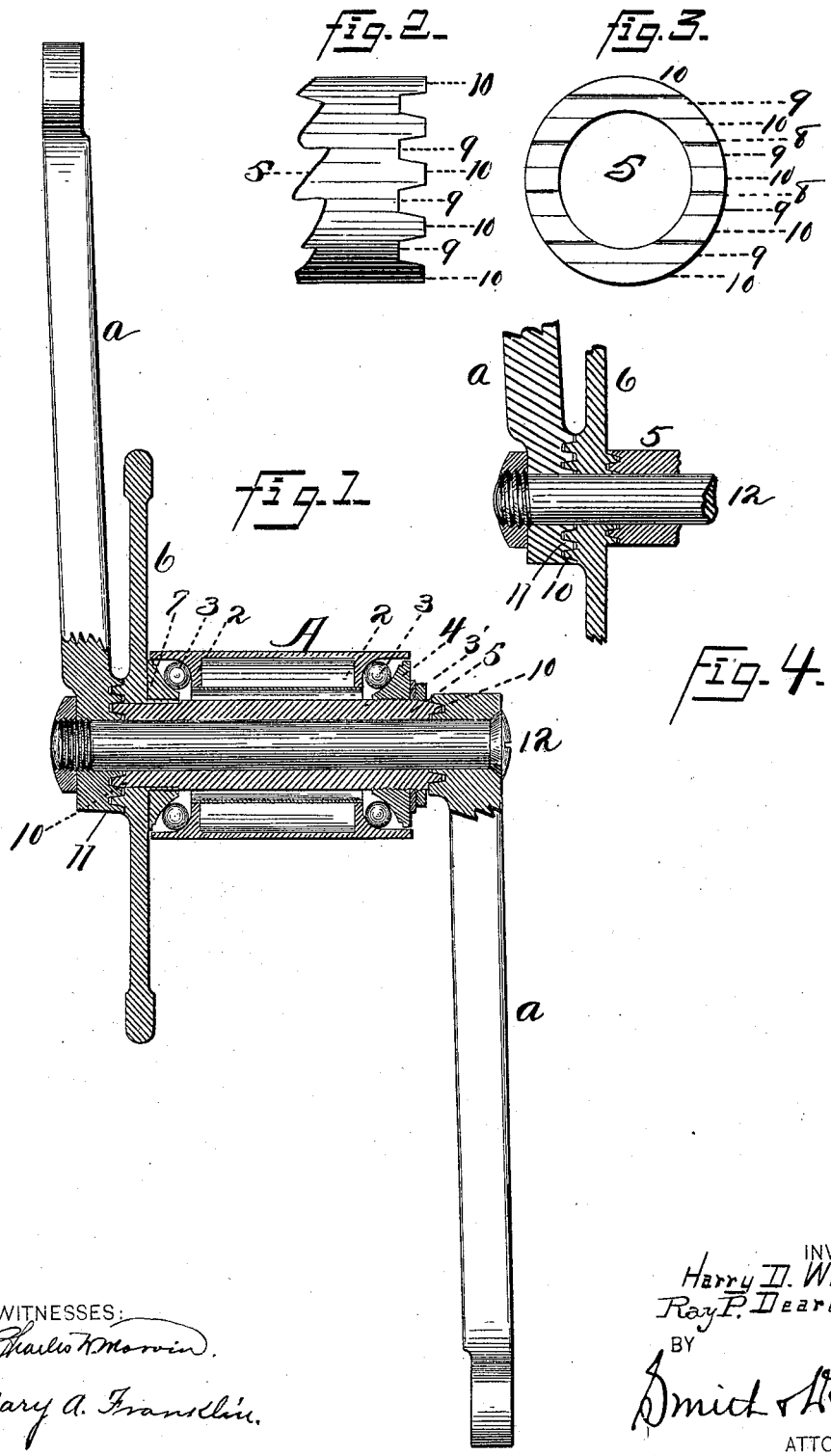
WITNESSES:
INVENTORS
Harry D. Weed.
Ray P. Deardorff.
BY
ATTORNEYS.

UNITED STATES PATENT OFFICE.

HARRY DE LYNE WEED AND RAY P. DEARDORFF, OF SYRACUSE, NEW YORK.

CRANK FOR BICYCLES.

SPECIFICATION forming part of Letters Patent No. 594,109, dated November 23, 1897.

Application filed October 26, 1896. Serial No. 610,101. (No model.)

*To all whom it may concern:*

Be it known that we, HARRY DE LYNE WEED and RAY P. DEARDORFF, of Syracuse, in the county of Onondaga, in the State of New York, have invented new and useful Improvements in Cranks for Bicycles, of which the following, taken in connection with the accompanying drawings, is a full, clear, and exact description.

Our invention relates to cycles, and particularly to crank-shafts and attachments thereof, and has for its object to provide improved means for attaching the crank and also the sprocket or gear to the crank-shaft in such manner as to produce a strong and firm attachment for pedaling in either direction and permitting the ready removal or replacing of the crank. It is constructed as follows, reference being had to the accompanying drawings, in which—

Figure 1 is a vertical sectional elevation of a crank-shaft sprocket or gear, pedal-cranks, and mountings. Fig. 2 is an enlarged side elevation of part of the tubular shaft. Fig. 3 is an end elevation of the same or of the hub of the sprocket or gear. Fig. 4 is a detail of the joint when the sprocket interlocks with the sleeve on one side and with the crank on the other.

A is a suitable crank-hanger, omitting the frame-bars and their connections thereto, provided with suitable cups 2, in which the balls 3 travel. A suitable ball-cone 4 is suitably mounted, as screwed, onto the crank-shaft 5. A suitable sprocket 6 is mounted upon said shaft, either loose or fast thereon, and having the inner end of its hub suitably prepared to constitute a mounting for the other cone 7. The crank-shaft is tubular, and its ends are transversely grooved by parallel lines 8, creating reëntrant angles or recesses 9. The outer face of the sprocket-hub is also grooved in like manner, so that its projections 10 and recesses 9 between them will properly aline with those of the shaft. The inner faces of the cranks *a a* are also grooved in the same manner, so that its projections and grooves 11 will mesh with those of the shaft and at one end with those of the sprocket also when that is grooved.

In Fig. 1 the sprocket is mounted upon the sleeve, while in Fig. 4 it is mounted directly upon the bolt, and its inner face is provided with transverse grooves to fit into and engage with those upon the outer end of the sleeve. In either case the sleeve, the sprocket, and both cranks are brought into position to interlock with each other and to be held in such interlocking relations by a single bolt 12 and such manner as to permit ready access to the ball-bearings by simply removing the bolt, when the cranks and sprocket are readily disconnected from each other and from the sleeve without disturbing the bearings.

The recesses and projections are usually transverse to the cranks and to their plane when in position.

A suitable nut and washer 13 can be used to lock the cone 4 against unscrewing.

The sleeve can also be made in sections, the inner ends of which are transversely grooved, as shown, to interlock when it is desired to make a sleeve-section integral with a crank or when made separately.

Having described our invention, what we claim, and desire to secure by Letters Patent, is—

In a crank-shaft mounting, the combination with a tubular shaft recessed in parallel lines across its ends, a sprocket-wheel recessed across its hub upon like lines, and cranks recessed across their inner faces upon like lines, of a bolt inserted through all of them to hold them in mesh and interlocked together.

In witness whereof we have hereunto set our hands this 14th day of October, 1896.

HARRY DE LYNE WEED.
RAY P. DEARDORFF.

In presence of—
MARY A. FRANKLIN,
HOWARD P. DENISON.